(No Model.)
J. F. WYNKOOP.
RUBBER CAP FOR AXLE NUTS.
No. 564,323. Patented July 21, 1896.
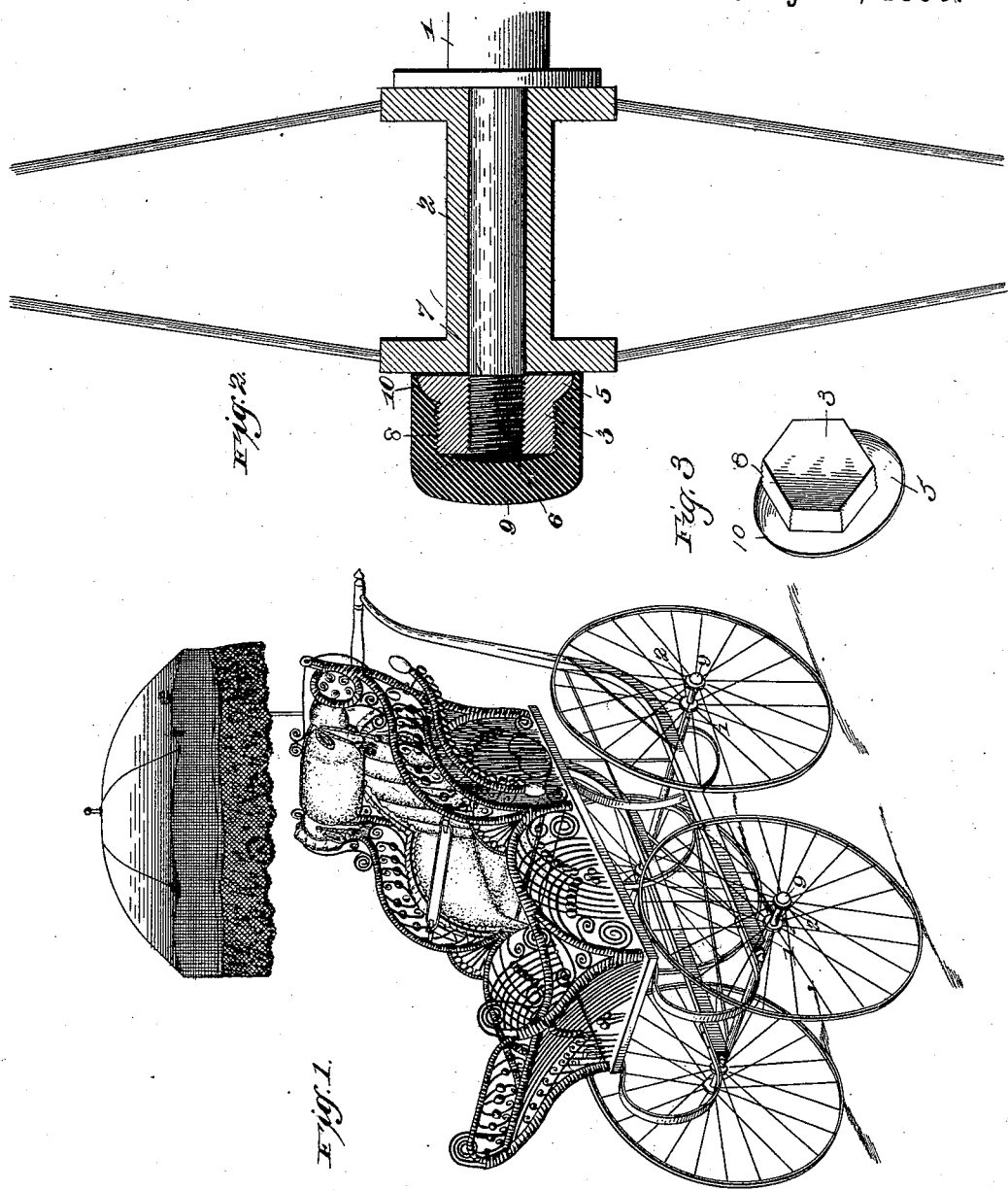
Witnesses
Wm H Doyle
R. M. Smith
Inventor
Jehiel F Wynkoop.
By his Attorneys.
C A Snow & Co.

UNITED STATES PATENT OFFICE.

JEHIEL FRANKLIN WYNKOOP, OF MUSCATINE, IOWA.

RUBBER CAP FOR AXLE-NUTS.

SPECIFICATION forming part of Letters Patent No. 564,323, dated July 21, 1896.

Application filed February 16, 1895. Serial No. 538,703. (No model.)

*To all whom it may concern:*

Be it known that I, JEHIEL FRANKLIN WYNKOOP, a citizen of the United States, residing at Muscatine, in the county of Muscatine and State of Iowa, have invented a new and useful Rubber Cap or Protector, of which the following is a specification.

My invention relates to an improvement in rubber caps or protectors, and is especially designed for use in connection with the nuts or burs on the ends of the axles of baby-carriages and other vehicles, such as children's wagons, velocipedes, &c.

The object of my invention is to cover and protect the projecting nuts on the axles of baby-carriages and other wheeled vehicles, which are generally stored or kept in hallways, by means of a rubber cap or cover adapted to be applied to a nut by threading or roughening the corners of the nut and screwing the rubber cap thereon.

My invention consists in certain features and details of construction hereinafter described, and pointed out in the claim.

In the accompanying drawings, Figure 1 is a perspective view of a baby-carriage with my improved caps or protectors applied thereto. Fig. 2 is an enlarged sectional view of a hub, nut, &c, showing the manner in which my rubber cap or protector is applied. Fig. 3 is a detail perspective view of a nut, showing the manner of roughening or serrating the corners thereof for the purpose of holding the rubber cap or protector in place.

Similar numerals of reference indicate corresponding parts in all the figures of the drawings.

Referring to the drawings, 1 represents the axle of a baby-carriage or other vehicle, and 2 the hub of one of the wheels thereof.

3 indicates a nut, which may be of any shape, square or polygonal, for receiving a wrench, and provided with a plano-convex inner flange 5, extending around the inner edge of the nut. The outer end of the axle is screw-threaded at 6 to receive the nut 3, and the axle may also be provided with a shoulder 7, against which the nut is screwed in the usual manner.

The nut 3 is externally screw-threaded, as indicated at 8, at the corners or angles of the flat surfaces thereof, the purpose of which is to engage the rubber cap or protector.

9 indicates a hollow cap made, preferably, of soft rubber, and of a size sufficient to cover the nut and fit snugly around the same. The threaded corners or angles 8 of the nut embed themselves in the soft-rubber cap 9 and effectively prevent the escape thereof. The rubber cap 9 may be grooved or provided with an annular recess or rabbet 10 for fitting the flange 5, and other minor changes may be resorted to without departing from the spirit of this invention for accommodating the cap 9 to the nut 3. The nut 3 may be of any ordinary or usual form.

It will be apparent that my improvement may be applied to other wheeled vehicles, such as velocipedes, children's wagons, toys, &c., as well as baby-carriages. By means of this rubber cap household furniture is protected from injury caused by the projecting nuts of such vehicles as I have described coming in contact therewith. It further serves to protect the dress of a woman from oil or grease when in the act of placing an infant in the carriage or taking it therefrom.

Having described my invention, I claim—

The combination with a nut having a plano-convex flange at its inner end and provided with wrench-engaging surfaces and also having its corners or intermediate portions between said surfaces roughened, of a hollow soft-rubber cap partially inclosing and covering said nut and engaging the roughened corners thereof, whereby the said cap is held upon the nut, said cap also having an annular rabbet at its inner end whereby it is adapted to embrace and inclose the plano-convex flange of the nut, substantially as described.

In testimony that I claim the foregoing as my own I have hereto affixed my signature in the presence of two witnesses.

JEHIEL FRANKLIN WYNKOOP.

Witnesses:
W. H. HUGHES,
J. M. BUTLER.